Sept. 5, 1950          G. A. ARNETT          2,521,624
ACCELERATOR CONTROL DEVICE
Filed June 23, 1948          2 Sheets-Sheet 1
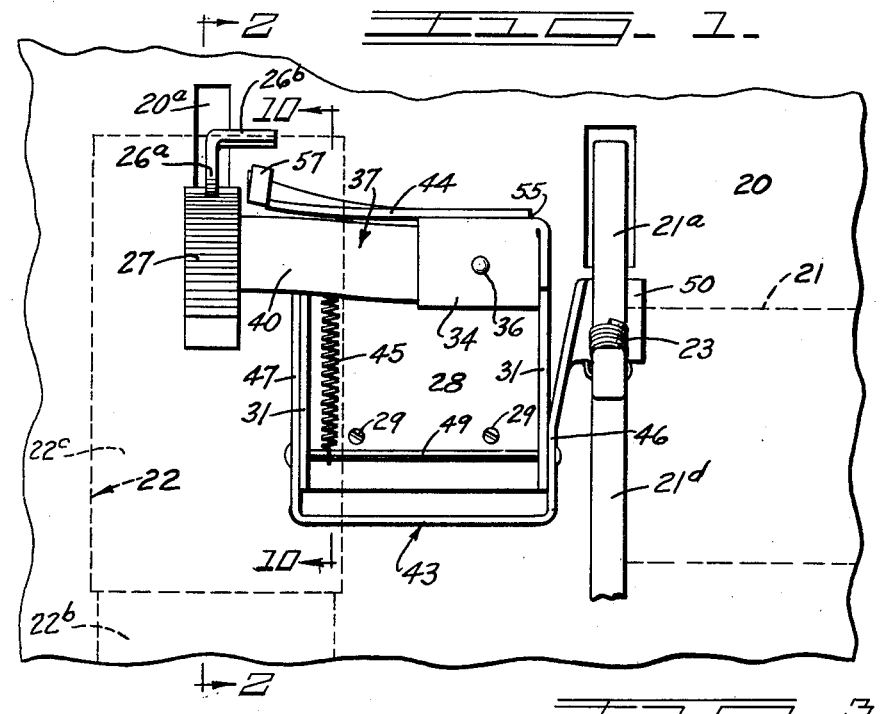
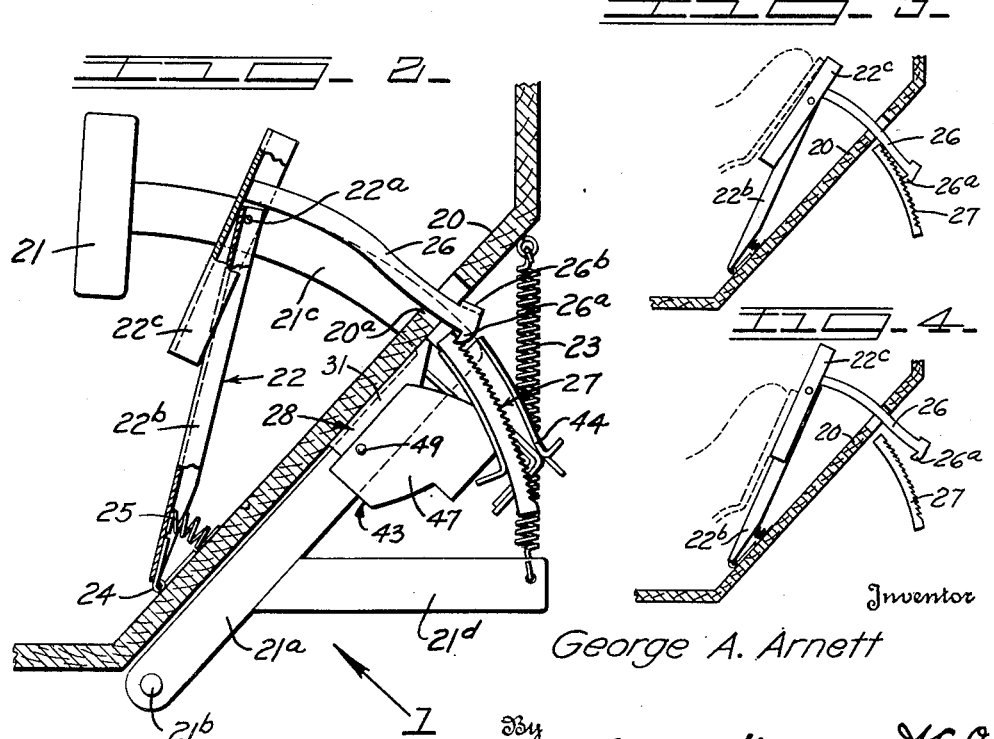
Inventor
George A. Arnett
By H. B. Willson & Co.
Attorneys

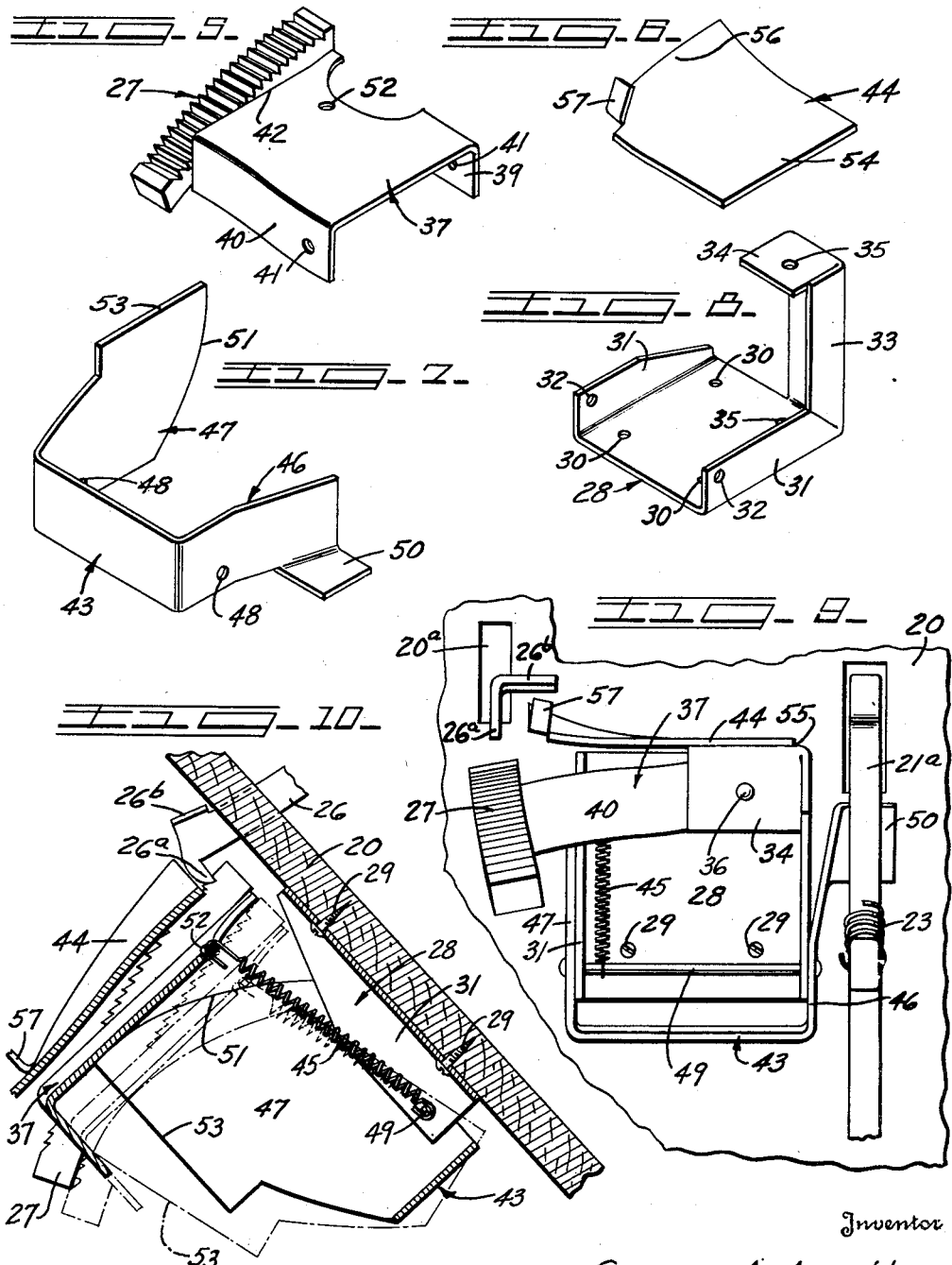

Patented Sept. 5, 1950

2,521,624

UNITED STATES PATENT OFFICE 2,521,624

ACCELERATOR CONTROL DEVICE

George A. Arnett, Wichita, Kans., assignor of one-half to Harry S. Williams, Wichita, Kans., and one-half to Paul E. Dopps, Norton, Kans.

Application June 23, 1948, Serial No. 34,592

6 Claims. (Cl. 192—3)

1

The invention relates in general to improvements in motor accelerator control devices, and, in particular, to the type in which the accelerator pedal may be releasably held in a depressed position to obtain any selected uniform speed and yet may be instantly released by depressing in the ordinary manner either the accelerator pedal or the brake pedal.

In driving an automobile, truck, or similar motor vehicle, and especially on long trips, it is very tiresome to hold the foot on the accelerator continuously, and particularly on the open road where consistent uniform speed is desired. Drivers in the past have found it advantageous to set the hand throttle at the desired speed so that the foot may be rested by taking it off the accelerator pedal, but this has been found to be unsafe and has resulted in accidents.

The primary purpose of the invention is to provide improved means for latching or releasably holding the accelerator pedal in any depressed position by a slight pressure of the toe on the upper end of the pedal, the latch being immediately released when the pedal is depressed in the usual manner.

Another object of the invention is to provide an improved safety device for disengaging the above mentioned accelerator latching means by depressing the brake pedal.

Yet another object is to provide an efficient device that is inexpensive to manufacture because of its simplicity of construction.

Other objects will become apparent from the following description and the accompanying drawings, in which:

Figure 1 is an oblique bottom plan view looking in the direction of the arrow 1 in Fig. 2, and showing the parts in their normal positions.

Fig. 2 is a vertical sectional view taken on line 2—2 of Fig. 1.

Fig. 3 is a diagrammatic transverse section showing the method of engaging the accelerator latching means.

Fig. 4 is a diagrammatic section showing the method of disengaging the accelerator holding latch and also the manner of normally using the accelerator pedal.

Fig. 5 is a perspective view of the ratchet supporting plate.

Fig. 6 is a perspective view of the guide plate.

Fig. 7 is a perspective view of the cam plate.

Fig. 8 is an inverted perspective view of the attaching plate.

Fig. 9 is a view similar to Fig. 1 but showing parts in a different position.

2

Fig. 10 is a vertical sectional view taken on line 10—10 of Fig. 1.

A preferred construction has been illustrated and will be specifically described, but attention is invited to the possibility of making minor variations within the scope of the invention as claimed.

Referring more particularly to the drawings 20 denotes the usual inclined floor board of an automobile or other motor vehicle, 21 a brake operating pedal and 22 an accelerator pedal connected by means not illustrated to the carburetor. The brake pedal is shown in Fig. 2 as having a straight portion 21ª lying beneath and close to the floor 20, one end being pivoted at 21ᵇ and from its other end projects a curved arm 21ᶜ which moves through an opening in the floor and carries a foot piece at its upper extremity. This pedal 21 may be spring-actuated to its elevated or retracted position in any suitable manner, but as shown in Fig. 2 it has an angularly projecting arm 21ᵈ connected by a coil spring 23 to the under-side of the floor board.

The accelerator pedal 22 is suitably pivoted as at 24 to the top of the floor adjacent the brake pedal and a coiled expansion spring 25 is shown beneath its lower portion, but it is obvious that it may be elevated or retracted in any suitable manner. This pedal, however, comprises two sections pivotally connected at 22ª each section being channel-shaped in cross section. The main or body section 22ᵇ has its lower end hinged at 24 and its upper end carries the pivot 22ª. The upper section 22ᶜ is shorter and is mounted between its ends on the pivot pin 22ª so that its lower portion may telescope over the upper portion of section 22ᵇ when the foot is applied to the pedal in the usual manner. The upper portion of the tilting section 22ᶜ projects beyond the main section and carries a rigid arm 26 adapted to project through an opening 20ª in the floor. The lower free end of the arm 26 is formed with a downwardly and rearwardly projecting detent or pawl 26ª and a laterally projecting stop finger or lug 26ᵇ adapted to engage the underside of the floor to limit the upward movement of the pedal. The detent 26ª engages a relatively fixed but retractable locking ratchet 27 in the form of a toothed bar mounted beneath the floor board as hereinafter described. The ratchet bar 27 is preferably arcuate and the arrangement of the parts is such that when the foot is applied to the pedal in the usual manner as shown in Fig. 4, the detent 26ª will swing away from the ratchet and the pedal may be depressed until the desired speed is reached.

When it is desired to lock or latch the pedal in the desired position, the operator's heel is lifted and toe depressed as shown in Fig. 3. That causes the toe section 22ᶜ to tilt on the pivot 22ᵃ and the detent or dog 26ᵃ to engage one of the teeth of the ratchet 27, whereupon the foot may be removed from the pedal leaving it latched in the desired position. When it is desired to operate the accelerator in the usual manner, it is only necessary to place the foot on the pedal as seen in Fig. 4.

As a safety feature the latch device associated with the accelerator pedal may be automatically released when the foot brake is applied. That is accomplished by providing mechanism which is released on operation of the brake lever 21 and which retracts the ratchet bar 27 from the detent or pawl 26ᵃ to permit the spring 25 to move the accelerator pedal to its raised position shown in Fig. 1. In the latter the detent is engaged with the first or upper tooth of the ratchet due to the fact that the upper portion of the toe section 22ᶜ is heavier than its lower portion because of the weight of the arm 26.

The automatic releasing mechanism comprises an attaching plate or base 28 secured by screws, rivets or the like 29 to the under-side of the floor, such fastenings being passed through openings 30 formed in the generally rectangular body portion of the plate. As seen in Figs. 1 and 8 the plate 28 has opposed, depending, and forwardly-and-rearwardly extending side flanges 31 formed with alined pivot openings 32 adjacent their forward ends. At one of the rear corners of plate 28 is a downwardly projecting arm 33 of right-angular shape in cross-section and provided at its free end with a small rectangular plate 34 disposed parallel with the body plate 28. Alined pivot apertures 35 are formed in plate 34 and the opposed portion plate 28 to receive a pivot pin or rod 36 on which is hung a swinging member 37 carrying the ratchet bar 27. This ratchet carrying member as shown in Fig. 5 is in the form of a generally rectangular plate which extends transversely and is inclined in a downward and forward direction as seen in Figs. 2 and 10. It has at its front edge a short flange 39 and at its rear edge a long flange 40, these flanges being apertured as at 41 to receive the pivot pin 36. The ratchet bar 27 is welded at 42 in an angular or inclined position at the free edge of plate 37 and to its flange 40 as shown in Fig. 5.

The automatic releasing device also includes a brake lever actuated cam member 43 shown in Fig. 7, a guiding and stop member or plate 44 shown in Fig. 8 and a coil spring 45 which pulls the ratchet away from the detent 26ᵃ when the brake lever or pedal releases the cam member 43. The latter is in the form of a U-shaped plate having two substantially parallel arms 46 and 47 positioned on the outer sides of the flanges 31 of the attaching plate and apertured at 48 to receive a pivot pin or rod 49 which passes through the openings 32 in the flanges 31 as will be seen on reference to Figs. 1 and 9. The arm 46 is slightly bent and formed with a laterally projecting finger 50 positioned between the floor board and the straight portion 21 of the brake pedal so as to be moved by the latter. The arm 47 is enlarged and formed with a curved cam edge 51 adapted to bear against and ride upon the forward side of the ratchet carrying plate or member 37, the latter being held against said cam 51 by the spring 45 one end of which is hooked around the pivot rod 49 while its other end is hooked into an aperture 52 formed in plate 37. It will be seen that when the brake pedal is in its raised or released position shown in Fig. 2, it will lift finger 50 and hence the cam member 43 to cause the cam 51 to push the ratchet carrying plate 37 forwardly on its pivot 36 and thus put spring 45 under greater tension. This forward movement of plate 37 positions the ratchet bar 27 in its normal relatively fixed position so that its teeth may be engaged by the detent 26ᵃ when the toe section 22ᶜ of the accelerator pedal is tilted forwardly as shown in Fig. 3 to latch the pedal in a desired position. However, as soon as the brake pedal is depressed spring 45 will pull the ratchet plate or member 37 rearwardly to retract the tooth bar from the detent and said member 37 will push against the cam 51 to swing the member 43 and hence finger 50 downwardly. The arm 47 of member 43 is so proportioned that its flat end 53 will serve as a stop to engage the long flange 40 of member 37 and thus limit the downward swinging movement of the cam member 43 and hence the rearward swinging movement of the ratchet member.

The combined guiding and stop member 44 is rigidly fixed to the attaching member 37 and while it might be formed in one piece with the latter, it is shown in Fig. 8 as a separate substantially rectangular metal plate. Its edge 54 overlies and is welded as at 55 to one flange of the post or bracket 33 of the attaching plate 28. This plate 44 is thus positioned in front of ratchet member 37 and its free edge portion 56 is curved to correspond somewhat to the curvature of the arcuate toothed bar or ratchet 27. That edge is disposed to one side of the latter to serve as a guide and stop for the detent 26ᵃ and its arm 26. At the lower end of the edge 56 is a forwardly and upwardly bent stop lug 57 which lies in the path of finger 26ᵇ to limit the downward movement of arm 26. Said finger 26ᵇ in its up and down movement travels opposite the edge portion 56 and the latter will serve as a stop to limit the rearward swinging movement of arm 26 and hence prevent the detent 26ᵃ from following the ratchet bar when the latter is moved to its retracted position. When the detent is disposed above the plate 44, the rearward swinging movement of arm 26 is limited by one end of the slot 20ᵃ if detent 26ᵃ is not engaged with the ratchet.

It is believed that the operation and advantages of the invention will be apparent from the foregoing detailed description, but it is to be noted that the device does not interfere with the usual manual operation of the foot accelerator and that when it is desired to latch the accelerator pedal in any adjusted position, it is only necessary to shift the foot from the position shown in Fig. 4 to the position shown in Fig. 3 and to then lift the foot from the pedal. When the foot is again applied to the accelerator pedal in the ordinary manner, the detent is disengaged from the locking ratchet and the latter remains in its relatively fixed position so that the detent may be again engaged with it by simply angling the foot. In an emergency it is natural for the operator to apply the brakes and when the brake pedal is depressed, the latch device will be instantly released to free the accelerator pedal and the spring actuated parts will snap the ratchet to a retracted position.

What is claimed is:

1. In an accelerator control device the combination of a spring retracted accelerator pedal having an elongated main section pivotally mounted at one of its ends and an elongated vertically tiltable toe section pivoted nearer its upper end than its lower end to the free end of said main section and held in its normal position by the weight of its lower portion, said toe section extending longitudinally of the main section and having its lower portion overlying said main section longitudinally thereof and its upper portion projecting from the free upper end of the main section forming a longitudinal extension of said main section, and a releasable latching means for said pedal comprising coacting members one of which has a row of ratchet teeth and the other of which extends from the upper portion of the toe section and is provided with a detent to engage said teeth, the member carrying the ratchet teeth being relatively stationary and the other having movement along the ratchet teeth when the upper portion of said toe section of the pedal is depressed to hold the pedal in an adjusted position.

2. A device in accordance with claim 1 in further combination with means for manually retracting said ratchet teeth carrying member from the path of movement of said coacting detent carrying member.

3. A device in accordance with claim 1 in further combination with a spring retracted brake pedal and spring actuated means for moving said ratchet teeth carrying member out of the path of movement of said coacting detent carrying member, said last mentioned means including a part in the path of movement of the brake pedal, whereby when the brake is in its retracted position said ratchet teeth carrying member will be held in the path of movement of said coacting detent carrying member and when the brake pedal is operated, said spring means will be released to retract said ratchet teeth carrying member from the path of movement of said coacting detent carrying member.

4. In an accelerator control device, the combination with the floor board and the pivoted, spring retracted brake pedal of a motor vehicle; of an accelerator pedal having a main section pivotally mounted at one end above the floor board and spring actuated to a retracted position, said accelerator pedal having a vertically tiltable toe section pivoted between its ends to the free upper end of the main section to form a longitudinal extension of the same yieldably held in its normal position by weight of its rear end portion, a latch arm fixed to the upper portion of said toe section and extending downwardly through an opening in said floor board and carrying a detent at its lower end, a toothed latch bar for engagement by said detent mounted below said floor board, and means mounting said latch bar for retraction out of the path of movement of said detent, said means being movable into and out of position for engagement by the brake pedal and effective to release the accelerator pedal when the brake pedal is depressed.

5. A device in accordance with claim 4 in which said mounting means for said latch bar includes a pivoted member carrying said latch bar, spring means for actuating said pivoted member to retract its latch bar from said detent, a second pivoted member having a cam to engage said first pivoted member and also having a part lying in the path of movement of said brake pedal, whereby when the latter is moved to its retracted position said cam will move said first pivoted member against the tension of said spring means to position the latch bar in the path of movement of said detent, and when said brake pedal is actuated said spring means will swing said first pivoted member to retract its latch bar and to move said cam and said second pivoted member.

6. In an accelerator control device, the combination with the floor board, the pivoted spring retracted brake pedal and the pivoted, spring retracted, accelerator pedal of a motor vehicle, of latching means for said accelerator pedal including a tiltable, toe-operated, latch member carried by said pedal and having an arm extending below said floor board and carrying a detent and a stop finger, a toothed latch bar below said floor board to coact with said detent, means for retractably mounting said latch bar including an attaching plate, secured to said floor board and having a stop flange, a latch bar carrying member pivoted to said plate, a spring for actuating said latch bar member to move its latch bar out of the path of movement of said detent, a U-shaped member pivoted on said plate and having one arm provided with a cam to engage and move said latch bar member and a stop to engage said stop flange on said plate, the other arm of said U-shaped member having a finger overlying said brake pedal to be actuated by the same, and a detent stop plate carried by said attaching plate and having a portion adjacent said latch bar to be engaged by said stop finger on said detent carrying arm when said latch bar is retracted and also having a stop lug to be engaged by said stop finger to limit the downward movement of said arm and its detent.

GEORGE A. ARNETT.

REFERENCES CITED

The following references are of record in the file of this patent:

UNITED STATES PATENTS

| Number | Name | Date |
|---|---|---|
| 1,411,521 | Rogers | Apr. 4, 1922 |
| 1,425,695 | Reich | Aug. 15, 1922 |
| 1,436,154 | Dickerson | Nov. 21, 1922 |
| 1,605,341 | Gilbough | Nov. 2, 1926 |
| 1,662,211 | Shier | Mar. 13, 1928 |
| 2,239,962 | Howard | Apr. 29, 1941 |